US010618430B2

(12) United States Patent
Rubanovich

(10) Patent No.: US 10,618,430 B2
(45) Date of Patent: Apr. 14, 2020

(54) SEAT LATCH MECHANISM

(71) Applicant: Polaris Industries Inc., Medina, MN (US)

(72) Inventor: Boris Rubanovich, Oak Grove, MN (US)

(73) Assignee: Polaris Industries Inc., Medina, MN (US)

(*) Notice: Subject to any disclaimer, the term of this patent is extended or adjusted under 35 U.S.C. 154(b) by 62 days.

(21) Appl. No.: 15/975,252

(22) Filed: May 9, 2018

(65) Prior Publication Data

US 2019/0344684 A1 Nov. 14, 2019

(51) Int. Cl.
*B60J 7/00* (2006.01)
*B60N 2/015* (2006.01)
*B60R 11/00* (2006.01)
*B60N 3/10* (2006.01)

(52) U.S. Cl.
CPC ............ *B60N 2/0155* (2013.01); *B60N 3/103* (2013.01); *B60R 2011/0029* (2013.01); *B60R 2011/0078* (2013.01)

(58) Field of Classification Search
CPC .......... A61F 13/49011; A61F 13/49017; A61F 13/49061; A61F 13/496; B60N 2/01583; B60N 2/305; B60N 2/3011; B60N 2/0715; B60N 2/0825
See application file for complete search history.

(56) References Cited

U.S. PATENT DOCUMENTS

| | | | | | |
|---|---|---|---|---|---|
| 4,865,377 | A | * | 9/1989 | Musser | B60N 2/01583 296/65.03 |
| 4,978,158 | A | * | 12/1990 | Kubo | B60N 2/366 296/65.03 |
| 5,282,662 | A | * | 2/1994 | Bolsworth | B60N 2/01583 296/65.03 |
| 5,383,699 | A | * | 1/1995 | Woziekonski | B60N 2/01583 296/65.09 |
| 5,393,116 | A | * | 2/1995 | Bolsworth | B60N 2/01583 296/65.03 |
| 5,482,345 | A | * | 1/1996 | Bolsworth | B60N 2/01583 248/398 |
| 5,498,051 | A | * | 3/1996 | Sponsler | B60N 2/01583 296/65.03 |
| 5,577,805 | A | * | 11/1996 | Glinter | B60N 2/01583 297/378.12 |
| 5,775,763 | A | * | 7/1998 | Glinter | B60N 2/01583 296/65.03 |
| 6,022,166 | A | * | 2/2000 | Rogers, Jr. | B60N 2/01583 248/503.1 |

(Continued)

*Primary Examiner* — Kiran B Patel
(74) *Attorney, Agent, or Firm* — Harness Dickey

(57) ABSTRACT

A latch system for selectively coupling an object such as a seat or an accessory to a vehicle is disclosed having an object having a pair of rear legs each having a latch and a pair of front legs, each of the legs having a floor-engaging member having an upper surface and a pair of side surfaces. The floor has a pair of forward-front integral coupling members configured to slidably accept and engage the pair of front legs floor-engaging members, and two pair of rear-side integral coupling members positioned adjacent to both of the rear legs floor engaging members. Each latch positioned on each of the rear legs is configured to releasably engage two of the rear-side integral coupling members.

24 Claims, 16 Drawing Sheets

(56) References Cited

U.S. PATENT DOCUMENTS

| | | | | |
|---|---|---|---|---|
| 6,036,252 A * | 3/2000 | Hecksel | B60N 2/01583 | 296/63 |
| 6,065,804 A * | 5/2000 | Tanaka | B60N 2/01583 | 297/336 |
| 6,161,890 A * | 12/2000 | Pesta | B60N 2/01583 | 248/503.1 |
| 6,164,712 A * | 12/2000 | Ajisaka | B60N 2/01583 | 296/65.03 |
| 6,213,525 B1 * | 4/2001 | Nicola | B60N 2/01583 | 248/503.1 |
| 6,244,649 B1 * | 6/2001 | Scheck | B60N 2/01583 | 248/503.1 |
| 6,375,245 B1 * | 4/2002 | Seibold | B60N 2/01583 | 248/503.1 |
| 6,431,632 B1 * | 8/2002 | Kozikowski | B60N 2/01583 | 248/503.1 |
| 6,523,899 B1 * | 2/2003 | Tame | B60N 2/01583 | 297/331 |
| 6,629,710 B1 * | 10/2003 | Shafry | B60N 2/01583 | 292/216 |
| 6,793,285 B1 * | 9/2004 | Tame | B60N 2/3011 | 297/336 |
| 6,830,295 B2 * | 12/2004 | Duquesnay | B60N 2/01583 | 297/336 |
| 6,863,330 B2 * | 3/2005 | Yokoyama | B60N 2/01541 | 248/503.1 |
| 6,945,585 B1 * | 9/2005 | Liu | B60N 2/01583 | 292/216 |
| 6,974,173 B2 * | 12/2005 | Yokoyama | B60N 2/01583 | 248/503.1 |
| 7,108,305 B2 * | 9/2006 | Frazier | B60N 2/01583 | 296/65.03 |
| 7,198,316 B2 * | 4/2007 | Lutzka | B60N 2/01583 | 296/65.03 |
| 7,296,840 B2 * | 11/2007 | Martone | B60N 2/01583 | 248/503.1 |
| 7,357,436 B2 * | 4/2008 | Willing | B60N 2/01583 | 296/65.03 |
| 7,431,371 B2 * | 10/2008 | Miller | B60N 2/01583 | 296/65.03 |
| 7,434,862 B2 * | 10/2008 | Lutzka | B60N 2/01583 | 248/503.1 |
| 7,762,605 B2 * | 7/2010 | Otsuka | B60N 2/01583 | 296/65.03 |
| 8,251,450 B2 * | 8/2012 | Carroll | B60N 2/01583 | 297/331 |
| 8,851,548 B2 * | 10/2014 | Pacolt | B60N 2/01583 | 296/65.03 |
| 9,694,715 B1 * | 7/2017 | Gebauer | B60N 2/933 | |
| 2003/0132656 A1 * | 7/2003 | Thiel | B60N 2/20 | 297/361.1 |
| 2004/0183328 A1 * | 9/2004 | Daniel | B60N 2/01541 | 296/65.03 |
| 2004/0217618 A1 * | 11/2004 | LaVoie | B60N 2/01541 | 296/65.03 |
| 2015/0259011 A1 | 9/2015 | Deckard et al. | | |

* cited by examiner

SEAT LATCH MECHANISM

The present disclosure relates to a latch mechanism or system for a seat or accessory, and more particularly to a latch mechanism for selectively coupling a seat or accessory to an off-road vehicle.

BACKGROUND

Seat assemblies, such as those used in vehicles can include a coupling mechanism for enabling coupling a seat-assembly relative to the vehicle. To enable selective and stowing operation of the seat assembly, the seats are often bolted onto fasteners disposed in the floor. These traditional seat assemblies suffer from the particular disadvantage that the removal of the seat assembly may be difficult, and reattached seats may not be properly engaged with the floor.

Therefore, it is desirable in the industry to provide a seat assembly that includes floor-latch mechanisms. Also, the floor-latch mechanisms should be operable from a single actuation lever. The actuation lever should be preferably operable to a first position for enabling locking of a seat to a vehicle floor and to a second position for enabling removal from the floor.

Moreover, many times may be desirable to custom configure a vehicle, such as an off-road vehicle, depending on the task or adventure being conducted. With conventional seat assemblies, seats are again generally not easily removed and are not reconfigurable to accommodate other accessories that may be desirable. This would enable a vehicle to be custom configured with a desired seating configuration, as well as desired accessories associated therewith.

SUMMARY

This section provides a general summary of the disclosure, and is not a comprehensive disclosure of its full scope or all of its features.

According to the present teachings, a system is provided for selectively coupling a seat or accessory to a vehicle. The system has a seat or accessory having a leg or base member having a latch, the leg has a floor-engaging member having an upper surface and a pair of side surfaces. A floor having a forward-front integral coupling member is configured to slidably accept and engage the floor-engaging member associated with the front leg or front base member, and a pair of rear-side integral coupling members positioned adjacent to the floor engaging member of the rear leg or rear base member. A latch positioned on the rear leg configured to releasably engage the pair of rear-side integral coupling members, the latch having a pair of first members which are fixed with respect to the rear leg and pair of second members, the first members defining a pair of indexing notches, which are configured to lock the latch in one of a first locked position or in a second unlocked position. The latch second members, are rotatable from the first locked position to the second unlocked position, the first arms having a hook member, which is configured to engage the rear-side integral coupling members.

According to the teaching in the above paragraph, the second arm defines an aperture that slidable accepts a spring biased locking member.

According to the teaching in the above paragraphs, the second member is rotated into the first locked position which positions a hook semicircular surface interfaces with a complementary semicircular surface of the rear-side integral coupling member.

According to the teaching in the above paragraphs, the spring biases the locking member, into an indexing notch.

According to the teaching in the above paragraphs, the forward-front integral coupling member defines an aperture which has an inner upper bearing surface configured to engage the upper surface of the floor engaging member.

According to the teaching in the above paragraphs, the forward-front integral coupling member defines a pair of inner sides surfaces, which engage the pair of side surfaces of the floor-engaging member.

According to the present teachings, a system for selectively coupling a seat or accessory to a vehicle is provided. The system has a seat or accessory having a pair of front legs or front base members and a pair of rear legs or rear base members each having a latch, each of the legs having a floor-engaging member having an upper surface and a pair of side surfaces. The vehicle floor having a pair of forward-front integral coupling members configured to slidably accept and engage the pair of front legs floor-engaging members, and two pair of rear-side integral coupling members positioned adjacent to both of the rear legs floor engaging members. A latch is provided which is positioned on one of the rear legs configured to releasably engage two of the rear-side integral coupling members.

According to the teaching in the above paragraphs, the forward-front integral coupling members are selectively engaged with the upper surface and a pair of side surfaces.

According to the teaching in the above paragraphs, the forward-front integral coupling members define an aperture which has an inner upper bearing surface configured to engage the upper surface of the floor engaging member and a pair of inner sides surfaces, which engage the pair of side surfaces of the floor engaging member.

Further areas of applicability will become apparent from the description provided herein. The description and specific examples in this summary are intended for purposes of illustration only and are not intended to limit the scope of the present disclosure.

DETAILED DESCRIPTION

Figure 1:
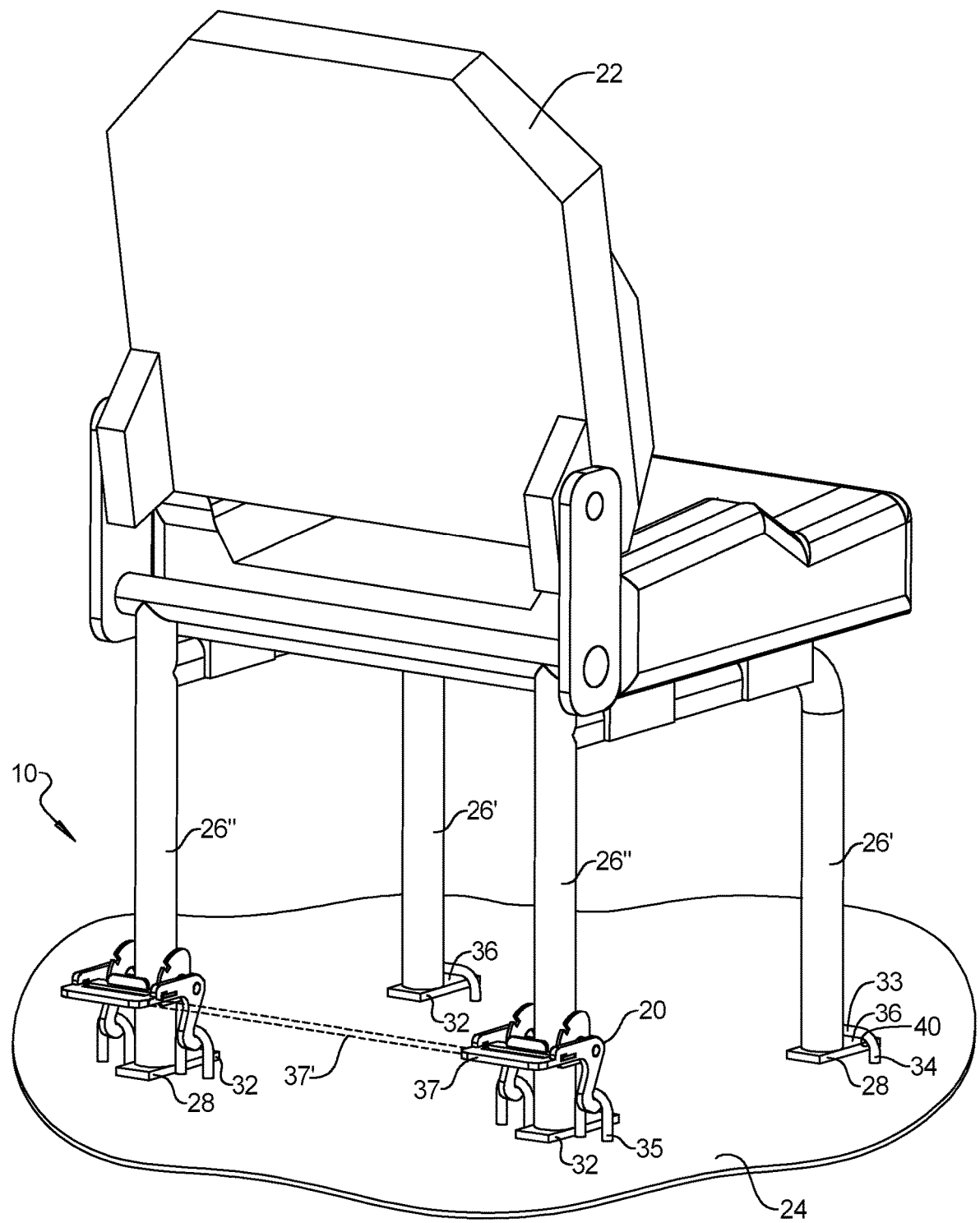
FIG. 1 represents a seat assembly coupled to a vehicle floor.
Figure 2:
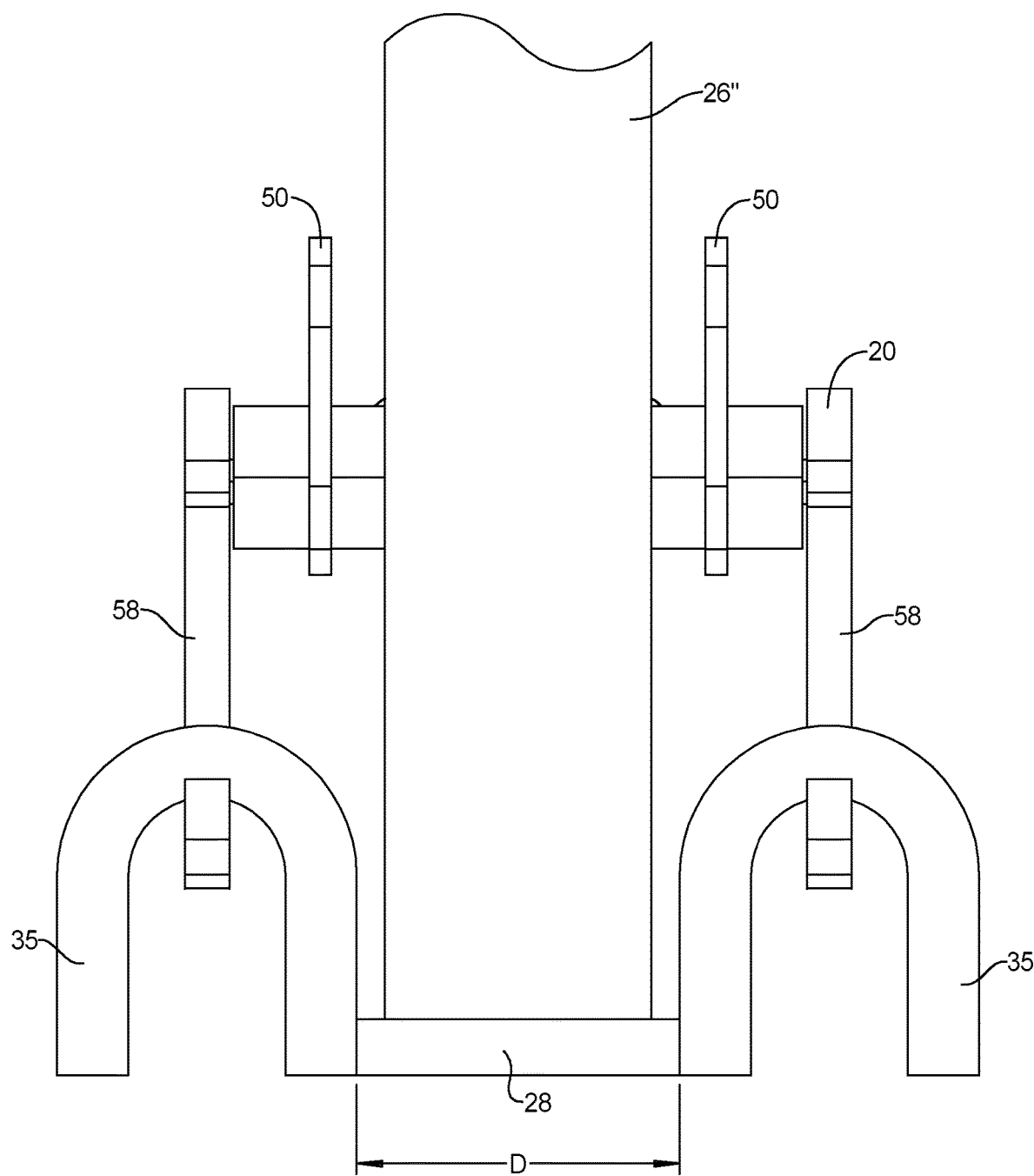
FIG. 2 is a front view of a seat latch mechanism according to the present teachings.
Figure 3:
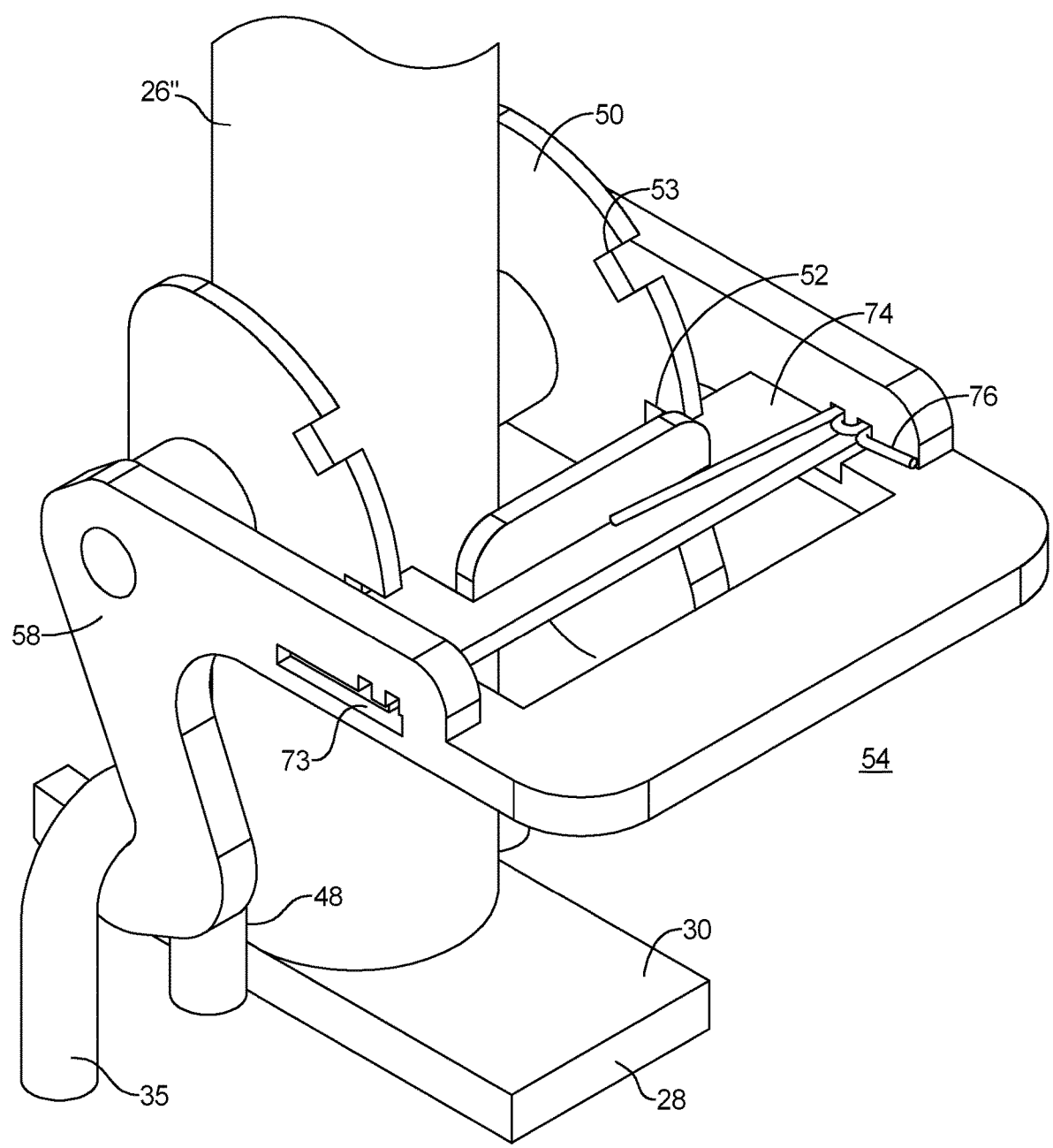
FIG. 3 is a perspective view of the seat latch mechanism shown in FIG. 2.

Example embodiments will now be described more fully with reference to the accompanying drawings.

As shown in FIGS. 1-6, a system 10 having a latch 20 for coupling an object such as a seat 22 or an accessory, further described herein, to the floor 24 of an off-road vehicle (see FIGS. 11-17) is disclosed. The seat 22 has four legs or base members 26, which are separated as front legs or base members 26' and rear legs or base members 26". Associated with each of the rear legs 26" is the latch 20. Each leg 26 has a floor-engaging member 28 having an upper surface 30 and a pair of side surfaces 32. The floor 24 had a pair of forward-front u-shaped integral coupling members 34 which are configured to slidably accept and engage the floor-engaging members 28 associated with the front pair of legs 26'. Optionally, the floor can include a pair of rearward-front integral coupling members (not shown). The forward-front integral coupling members 34 are disposed over a front edge of the floor engaging member 28. In this regard, the forward-front integral coupling members 34 define an aperture 36 which has an inner upper bearing surface 33 configured to engage the upper surface 30 of the floor engaging member 28 and a pair of inner sides surfaces 40, which engage the pair of side surfaces 32 of the floor engaging member 28. The coupling members 28 can be bolted or welded to the floor 24, or can be attached in any other desired manner.

Positioned adjacent to both of the floor engaging members 28 of the rear legs 26" are two rear-side u-shaped integral coupling members 35. The two rear-side integral coupling members 35 are spaced apart a distance D which is equal to the width of the floor engagement member 28. When placed between the two rear-side integral coupling members 35, the pair of side surfaces 32 of the floor-engaging member 28 engages an exterior side surfaces 48 of the two rear-side integral coupling members 35 in a manner which can prevent relative movement of the floor engaging members 28 with respect to the floor 24. Here again, the coupling member, 35 can be secured to the floor 24 in any desired manner such as described above regarding coupling members 34.

To lock the seat 22 to the floor 24, the four legs 26 are slidiably positioned adjacent to the coupling members 34, 35. The floor-engaging member 28 upper surface 30 and the pair of side surfaces 32 are slidably positioned so as to engage the coupling members 34 associated with the front pair of legs 26'. As described below, the latch 20 is rotated to engage the coupling members 35.

As illustrated in FIG. 1, a handle 37 for the latch 20 can be an individual handle 37 for each individual latch 20 or it can include a single handle member 37', as shown in phantom that is able to simultaneously latch and unlatch the pair of latches 20.

The latches 20 are positioned on the rear legs 26" so as to allow them to releasably engage, the two rear-side integral coupling members 35. As best seen in FIGS. 2-6, the latch 20 has a pair of first members 50 which are fixed with respect to the rear leg 26" and pair of second members 58. The first members 50 have a pair of indexing notches 52 and 53, which are used to lock the latch 20 in a first locked position 54 or in a second unlocked position 56. The latch 20 second members 58, are rotatable from the first locked position 54 to the second unlocked position 56 upon releasing or engaging handle 37.

The second members 58 each have a first arm 60 and a second angularly displaced arm or hook member 62. The first arms 60 have the hook members 62, which are configured to engage the rear integral coupling members 35. In this regard, the hook members 62 are configured to selectively lockably engage an inner upper surface 64 of the rear-side integral coupling members 35. Each hook member 62 has a pair of tapered surfaces 66 and 68, which intersect at a semicircular surface 70. This semicircular surface 70 interfaces with a complementary semicircular surface 72 of the rear integral-coupling members 35.

Figure 4:
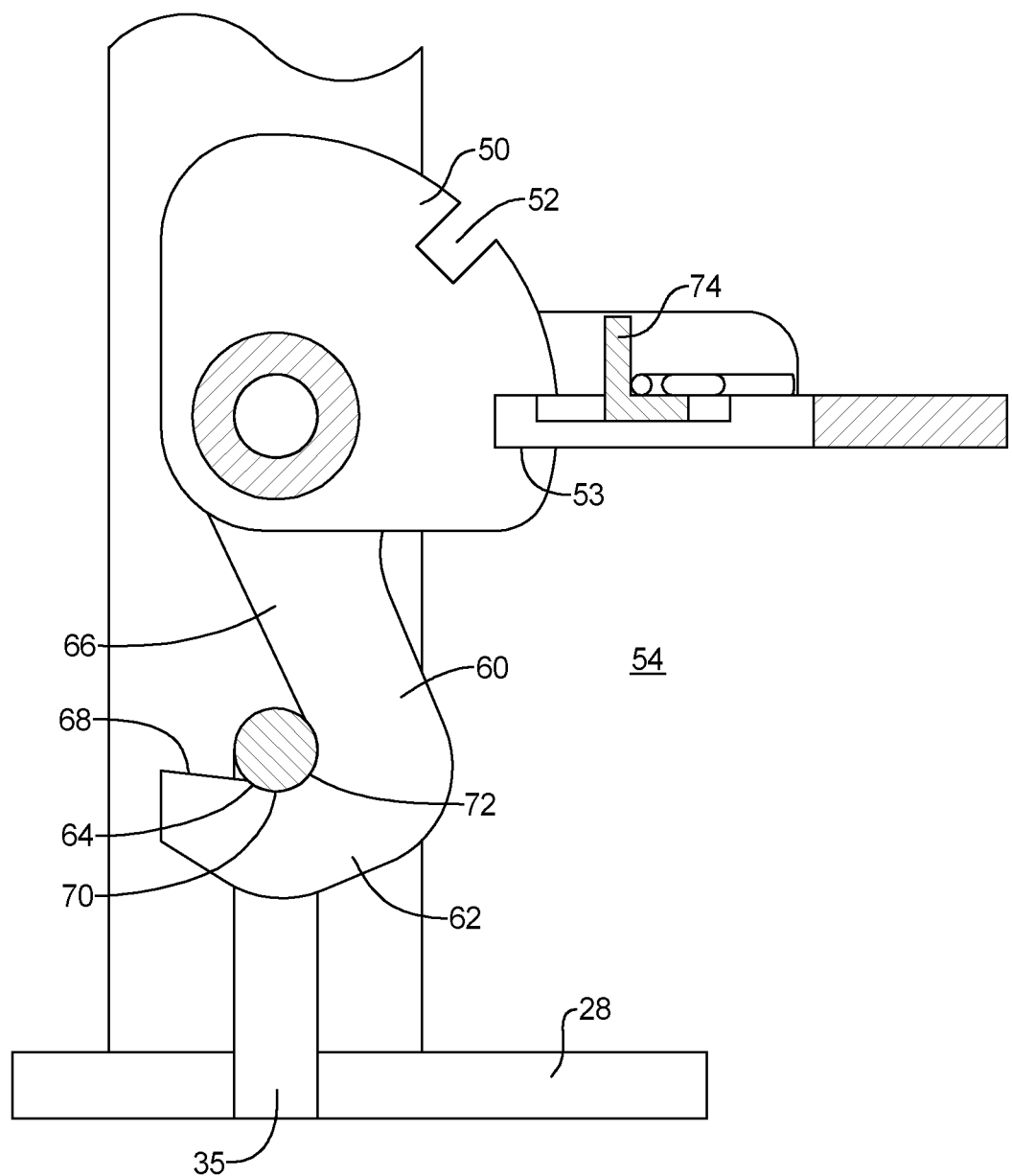
FIG. 4 is a side view of a seat latch mechanism according to the present teachings.
Figure 5:
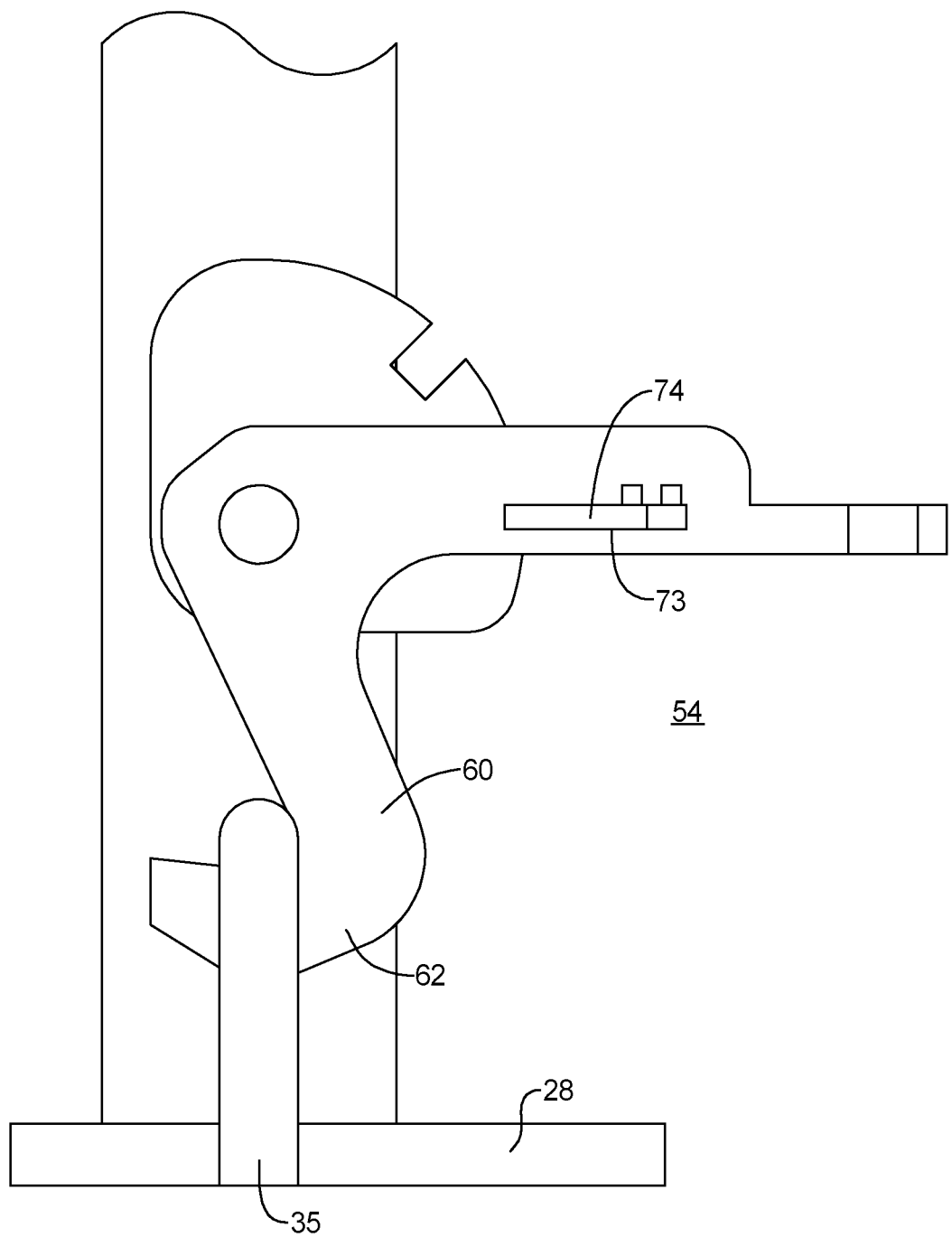
FIG. 5 is a side sectional view of a seat latch mechanism according to the present teachings in a latched configuration.
Figure 6:
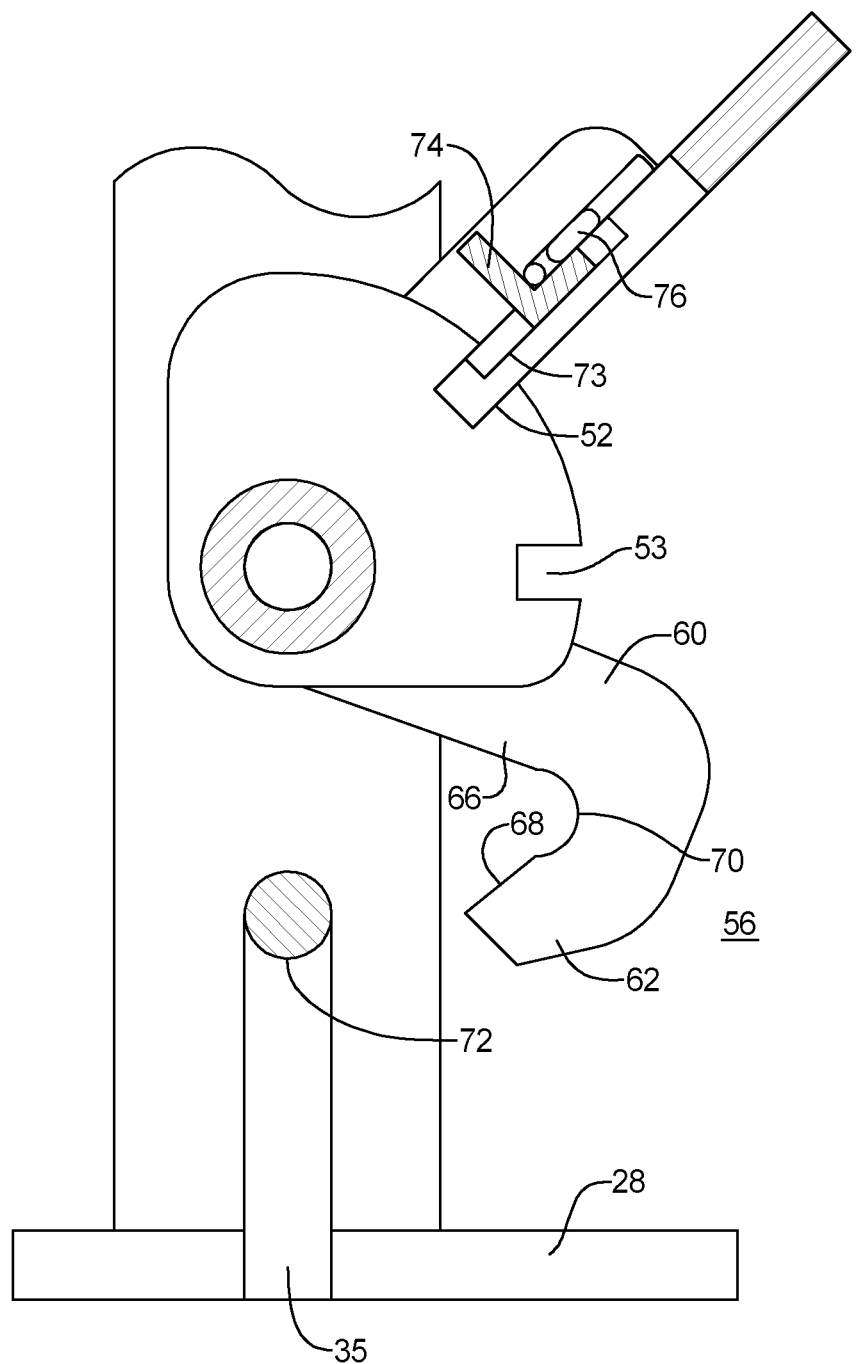
FIG. 6 is a side sectional view of a seat latch mechanism according to the present teachings in an open configuration.

The second arm 62 defines an aperture or slot 73 that slidable accepts a locking member 74. The locking member 74 is biased by a spring member 76 into the indexing notches 52 and 53. As seen in FIGS. 4-6, the second member 58 is rotated into the first locked position 54 which positions the hook 62 semicircular surface 70 to interface with a complementary semicircular surface 72 of the rear integral coupling members 35. In this position, the spring 76 biases the locking member 74, into the indexing notches 52. This locks the floor engaging member 28 to the floor 24, and thus the seat 22 to the floor 24.

To unlatch the seat 22 from the vehicle, the second members 58 are rotated into the second unlocked position 56 that translates the hook semicircular surface 70 interfaces from the complementary semicircular surface 72 of the rear integral coupling members 35. In this position, the spring biases the locking member 74, into the indexing notches 53. This unlocks the floor engaging member 28 from the floor 24, and allows the seat 22 to be slid rearward with respect to the floor 24 and removed.

Figure 7:
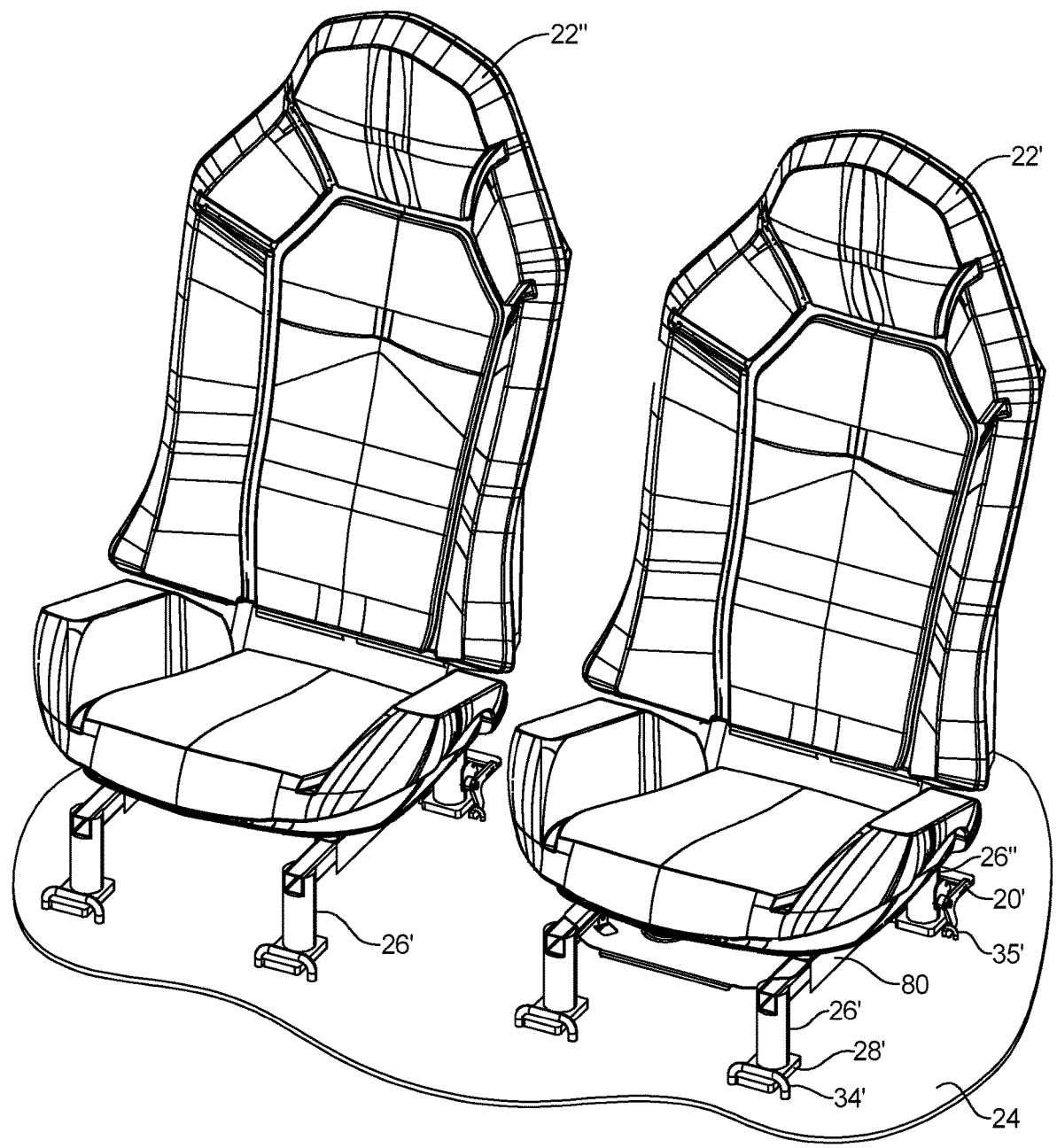
FIG. 7 represents a front perspective view of a pair of seat assemblies coupled to a side-by-side vehicle floor according to another embodiment of the present teachings.
Figure 8:
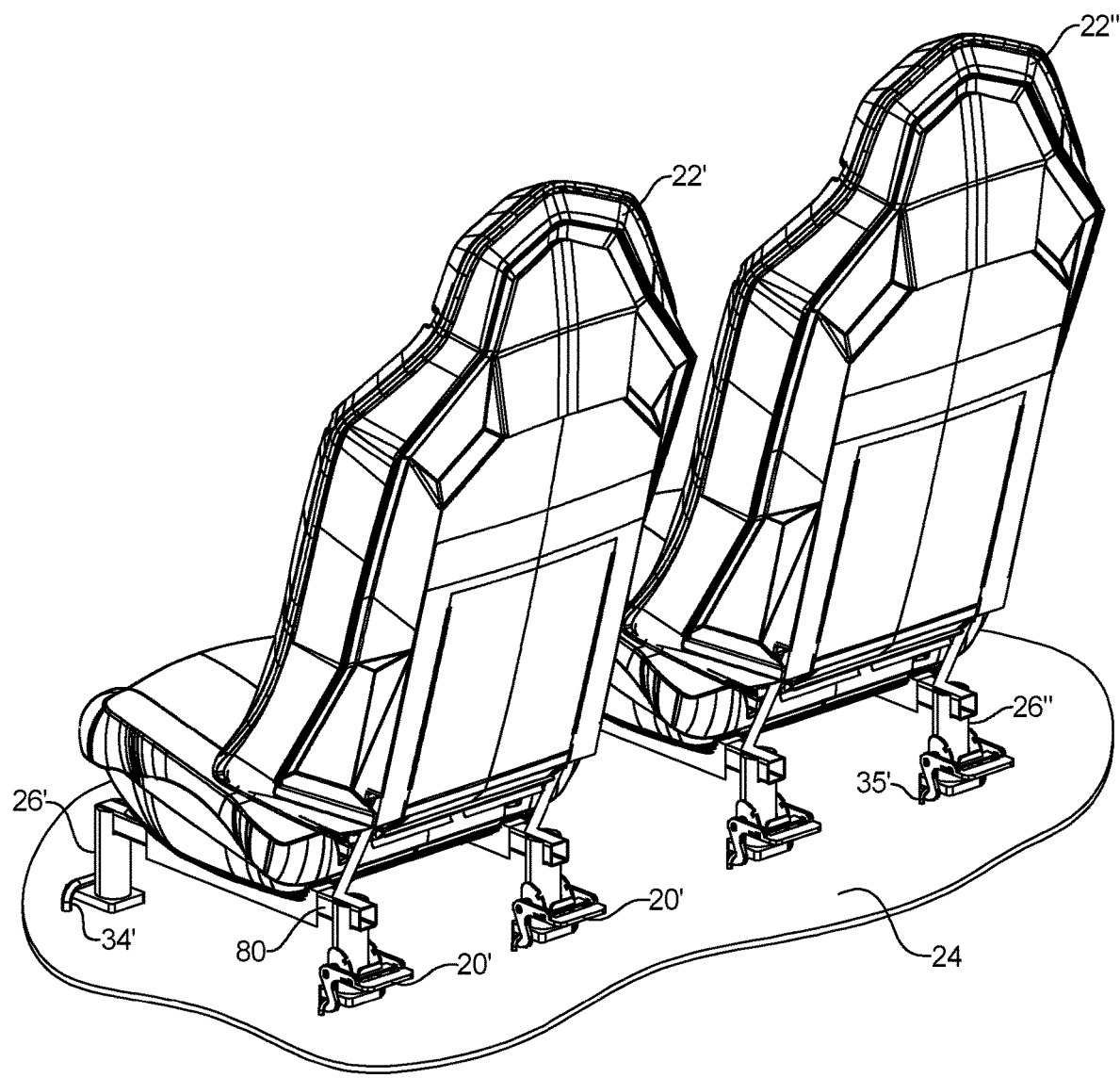
FIG. 8 is a rear perspective view of the seat assemblies of FIG. 7.

Referring to FIGS. 7 and 8, a pair of seats 22' and 22" for use in a side-by-side vehicle are illustrated coupled to the floor 24 of the vehicle according to teachings of an additional embodiment. It should be noted that like reference numerals will be used to identify like structures with respect to the embodiment illustrated in FIGS. 1-6 above. As illustrated in FIGS. 7 and 8, each seat 22' and 22" includes a pair of front legs or base members 26' and a pair of rear legs or rear base members 26". Each seat 22' and 22" are similarly attached to the floor 24 with floor engaging members 28' engaging front coupling members 34' and rear coupling members 35' and are latched in place via the latch 20' of the system 10, as discussed above. The seats 22' and 22" are substantially similar to the seat 22 and the associated latch assembly except that seat 22' and 22" have reduced length legs or base members 26' and 26" for coupling to a floor 24 of a side-by-side vehicle. Each seat 22' and 22" can be adjustably positioned between the front base members 26' and the rear base members 26" by way of slideably adjusting along horizontal tracks 80, as is known in the art.

Figure 9:
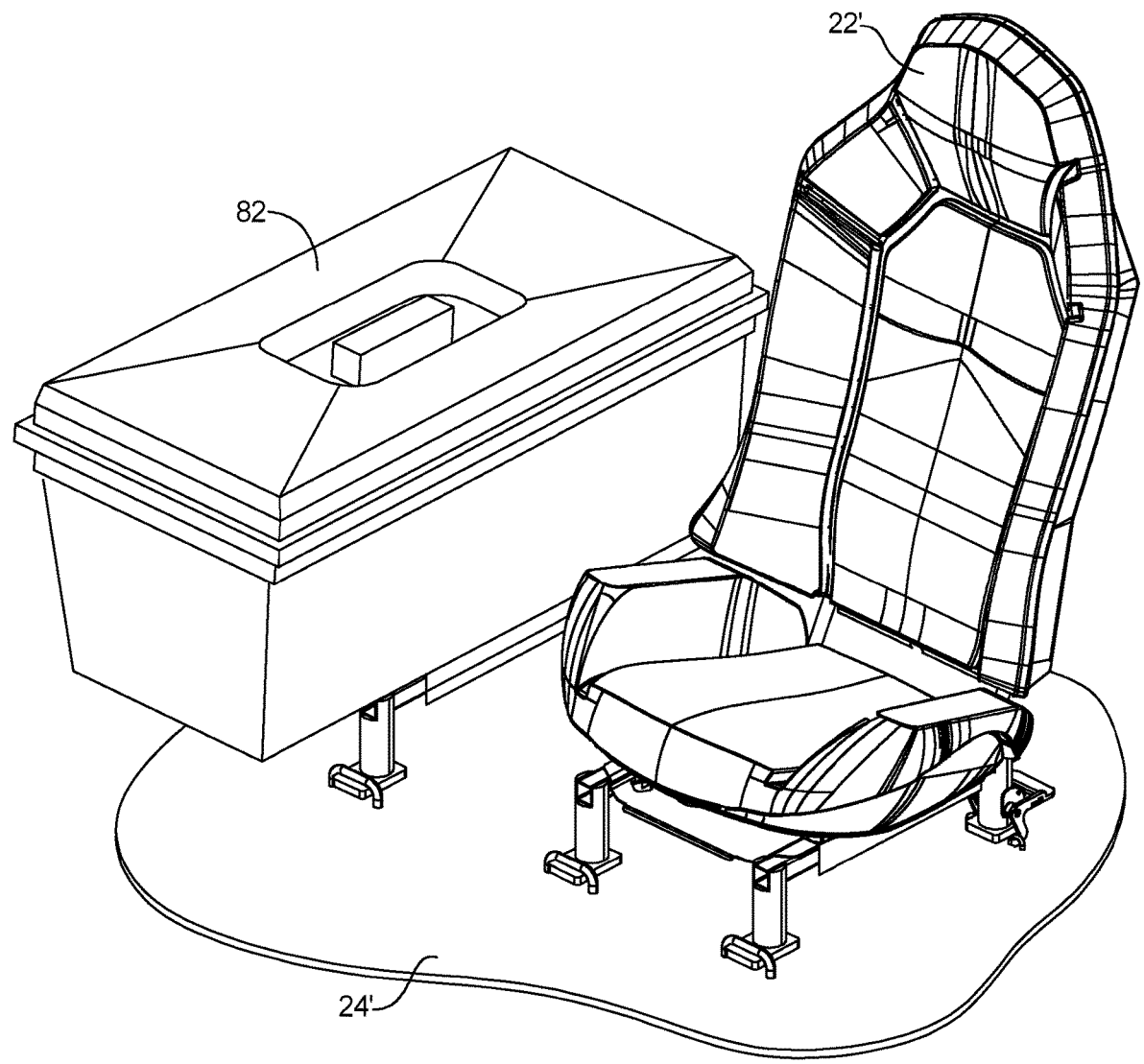
FIG. 9 is a front perspective view of one seat of the seat assembly of FIG. 7 and an adjacent accessory shown coupled to a vehicle floor.
Figure 10:
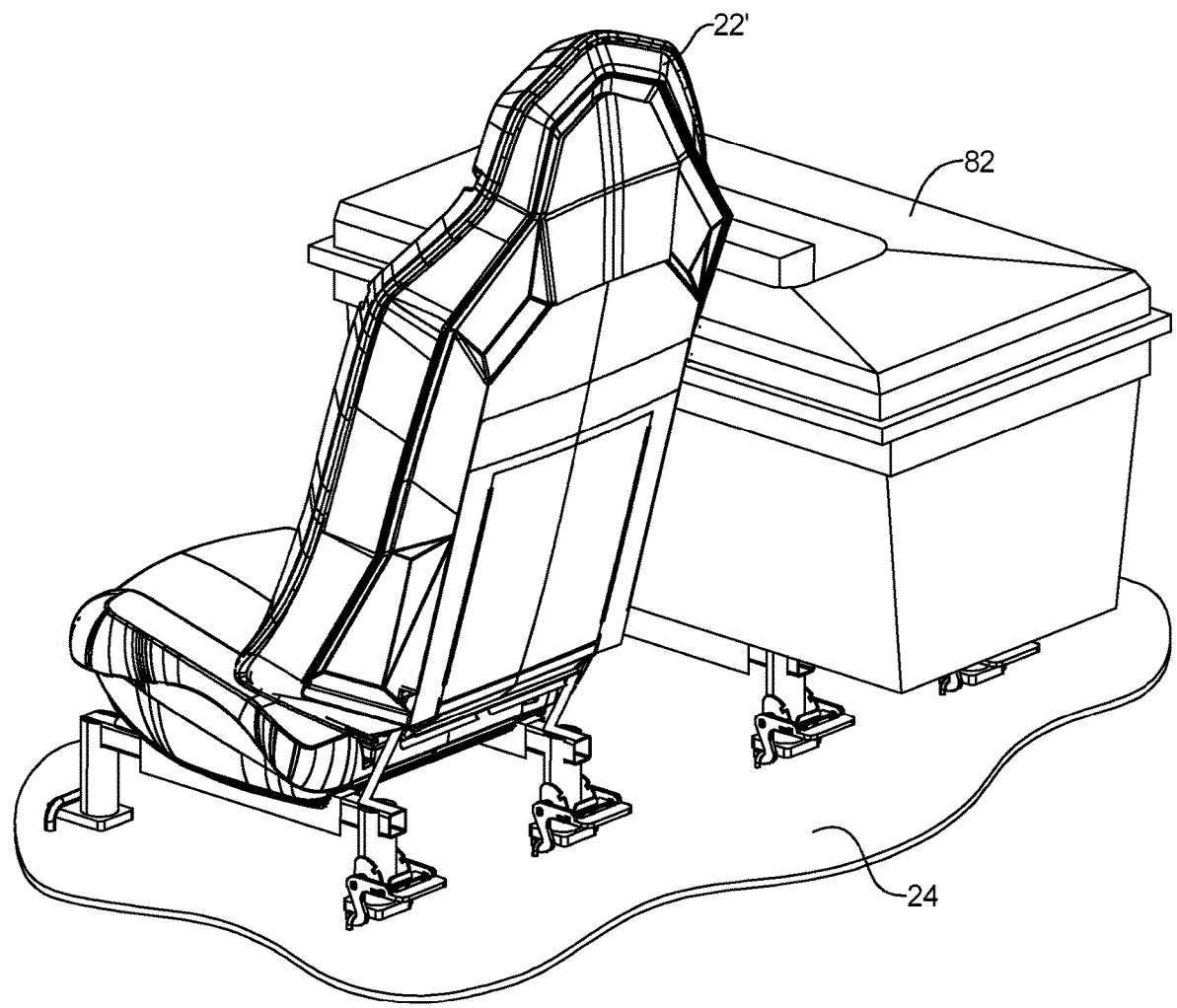
FIG. 10 is a rear perspective view of the seat assembly and accessory of FIG. 9.
Figure 11:
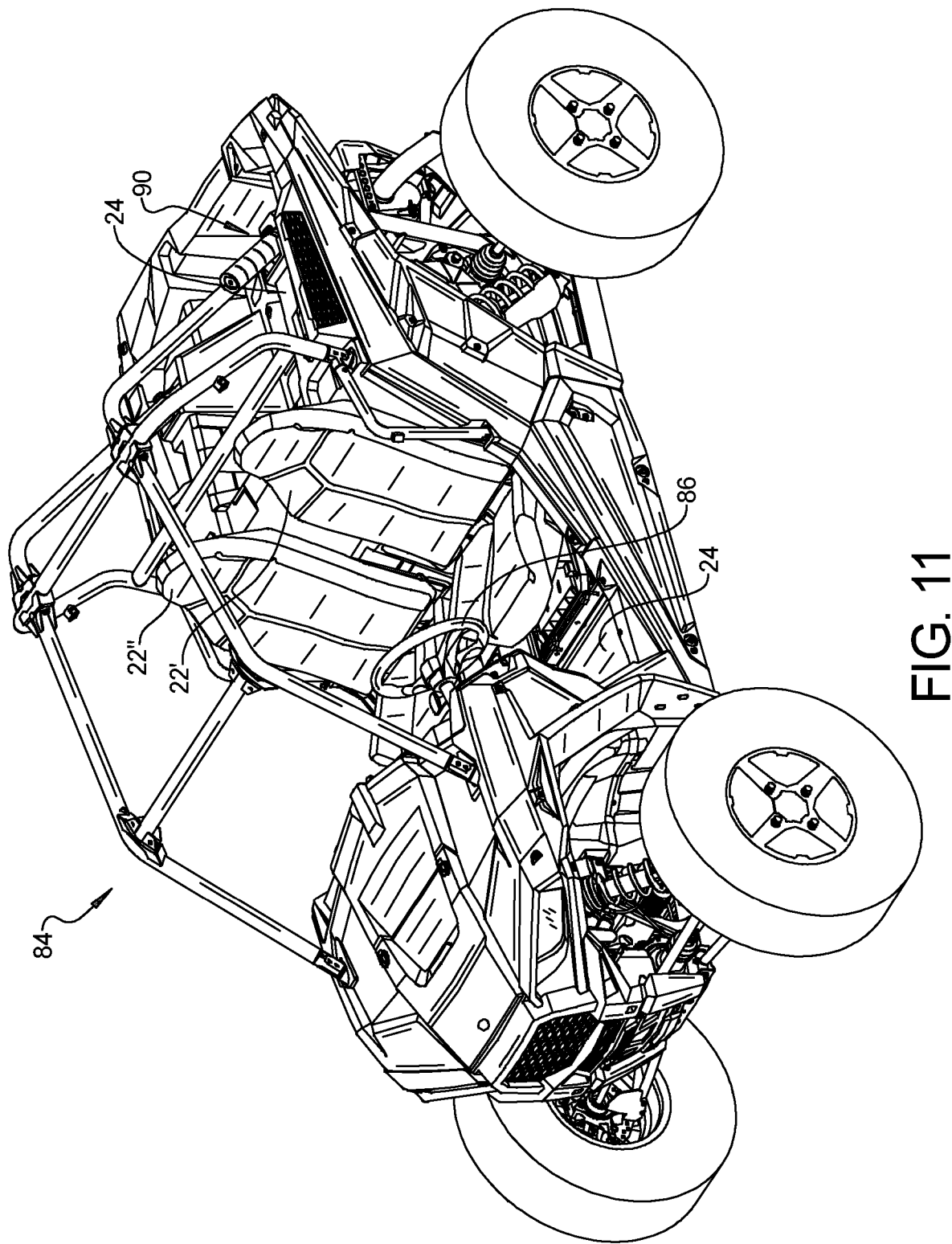
FIG. 11 is a front perspective view of an exemplary vehicle having a pair of side-by-side seats.
Figure 12:
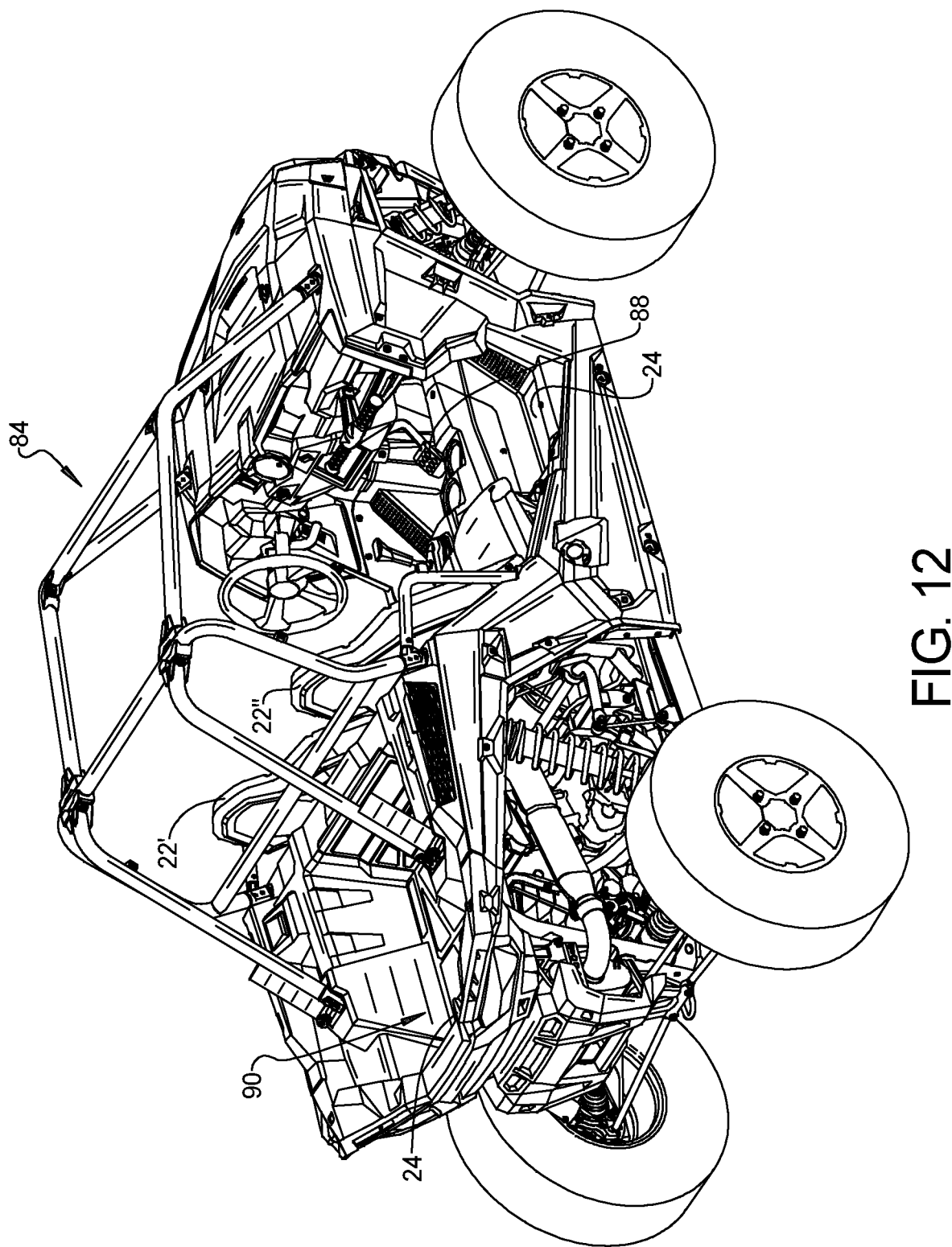
FIG. 12 is a rear perspective view of the vehicle of FIG. 11.
Figure 13:
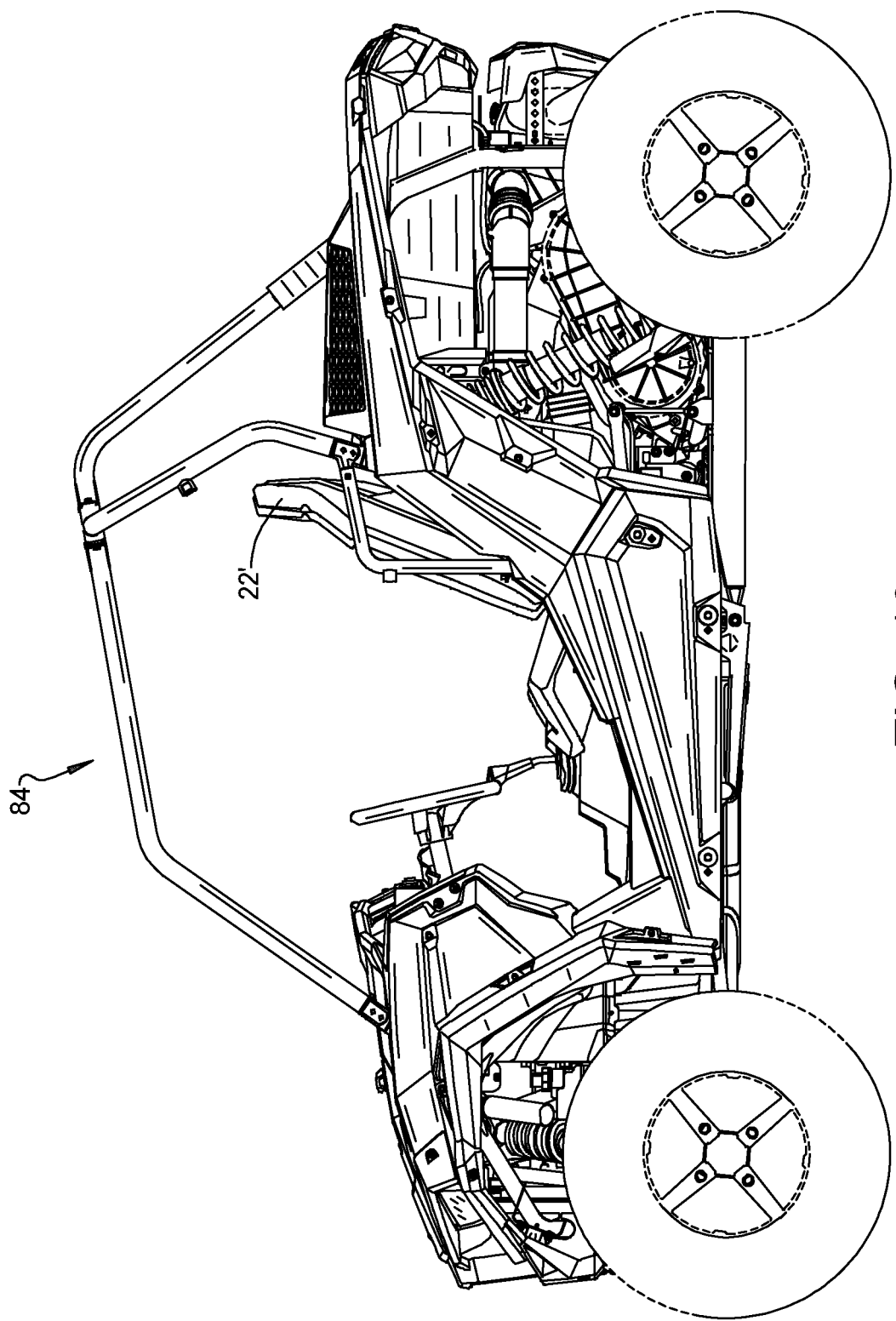
FIG. 13 is a side view of the vehicle of FIG. 11.
Figure 14:
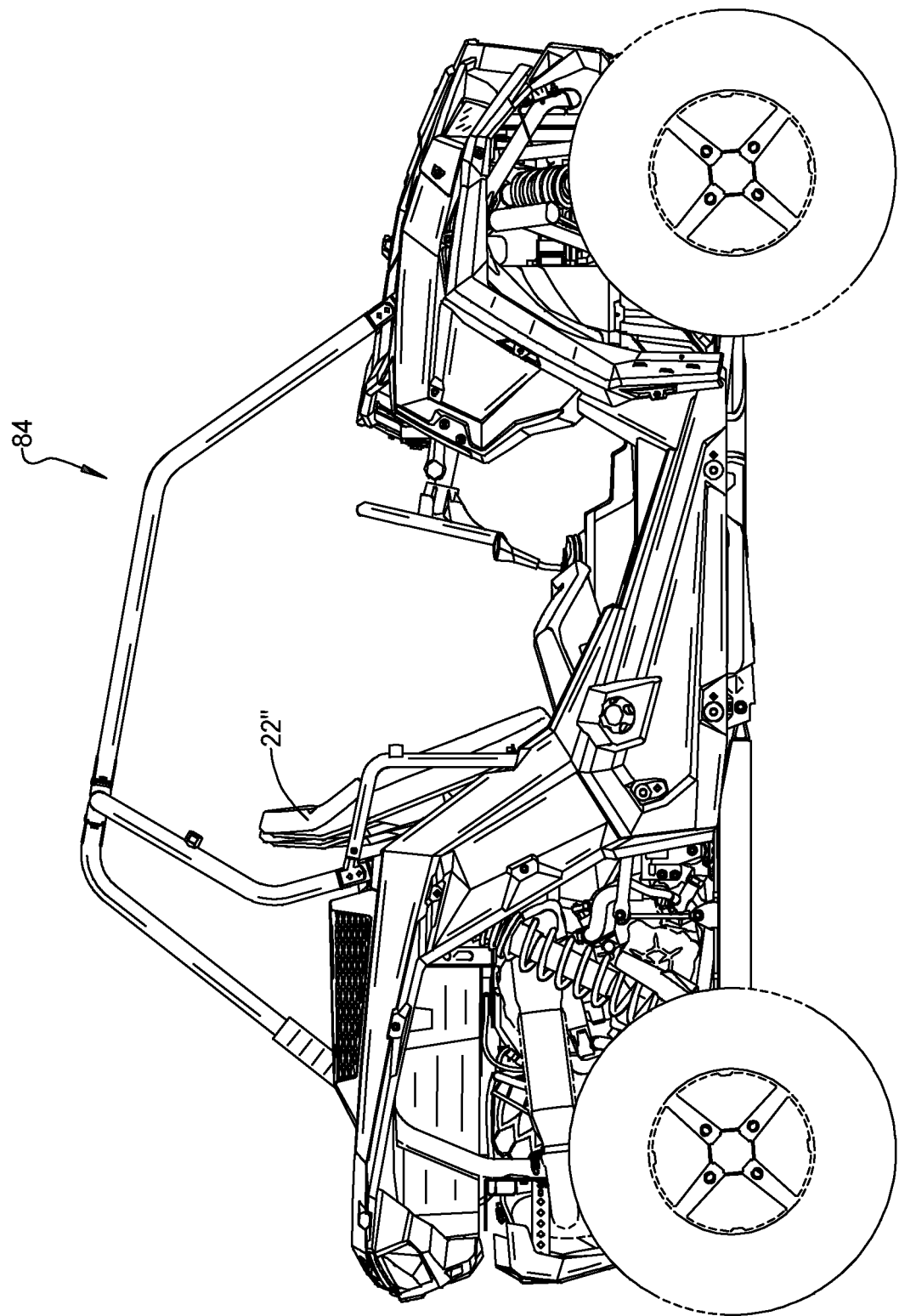
FIG. 14 is an additional side view of the vehicle of FIG. 11.
Figure 15:
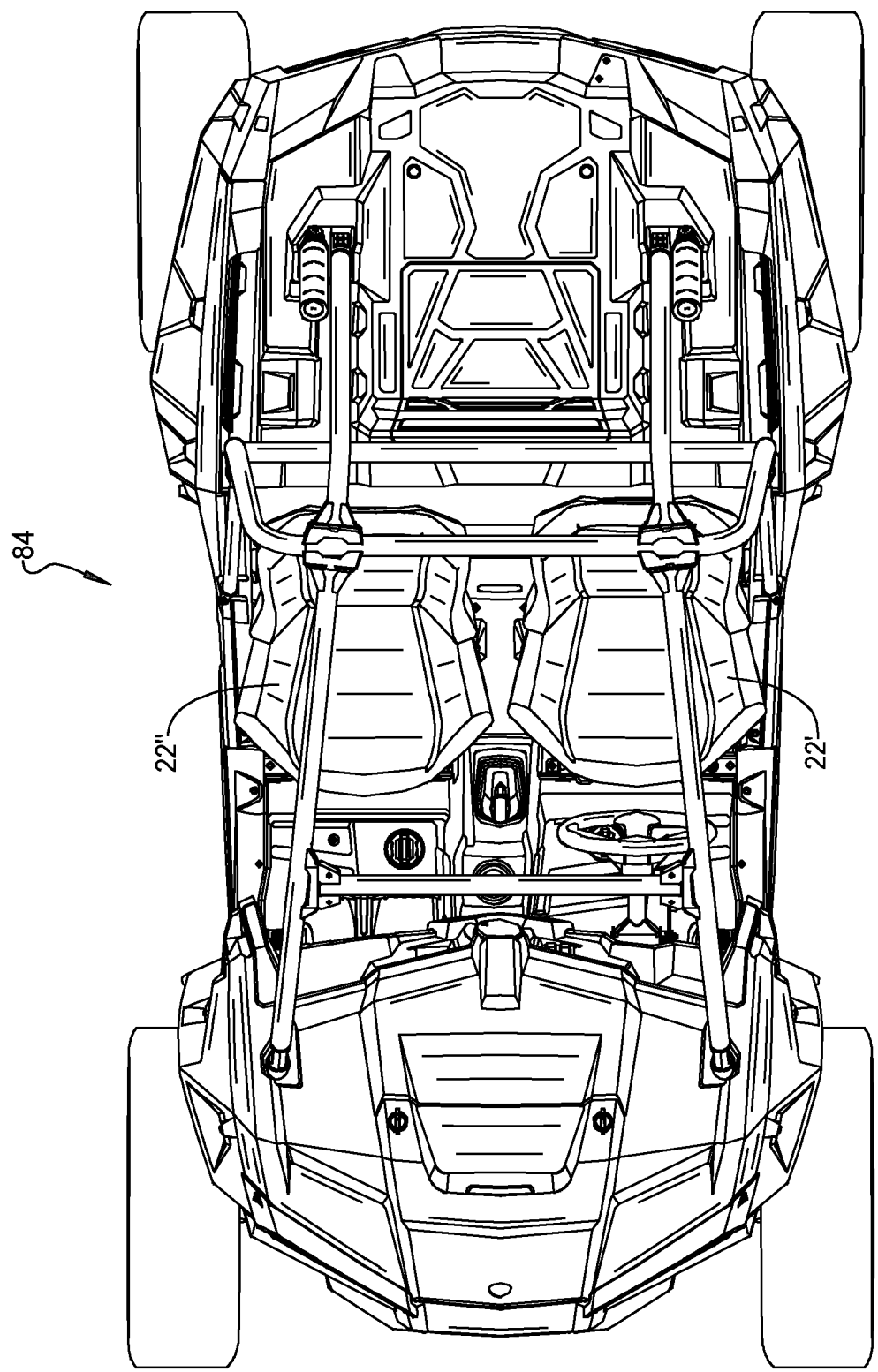
FIG. 15 is a top view of the vehicle of FIG. 11.
Figure 17:
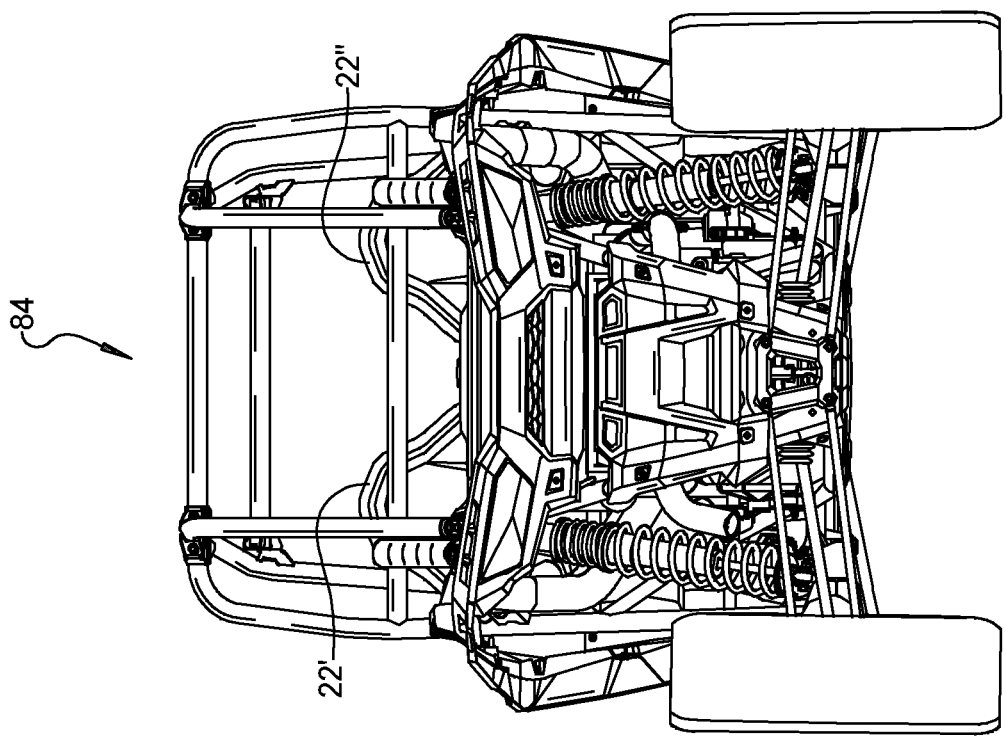
FIG. 17 is a rear view of the vehicle of FIG. 11.
Figure 16:
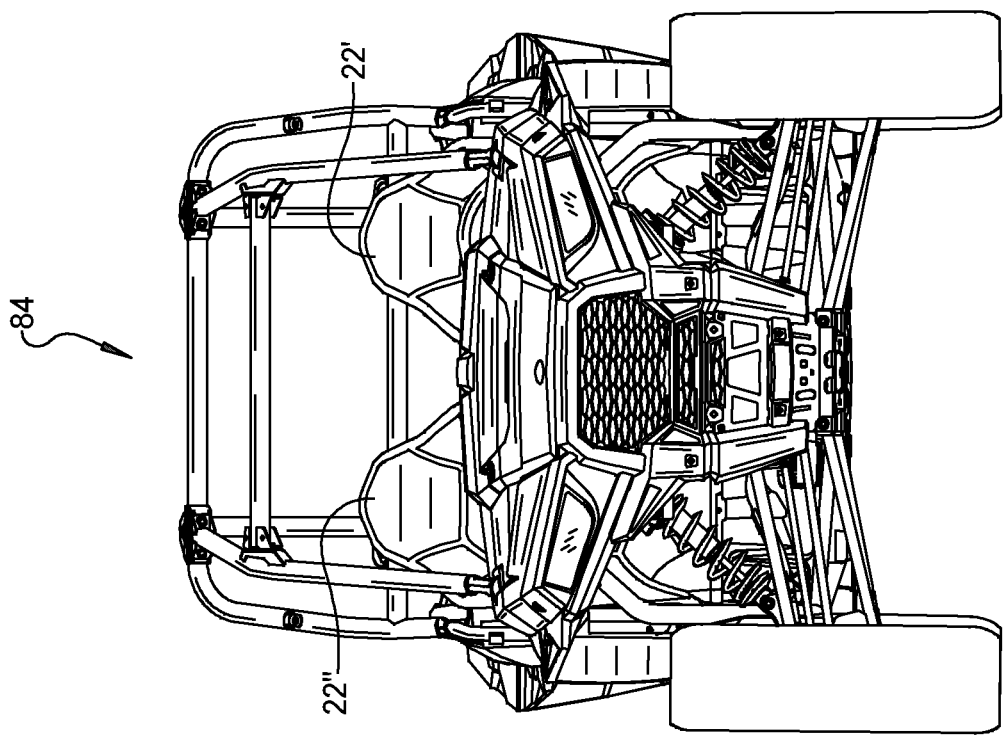
FIG. 16 is a front view of the vehicle of FIG. 11.

According to FIGS. 9 and 10, the driver seat 22' is shown attached to the floor 24 and positioned adjacent to an accessory 82. In this regard, by providing the versatile latching system 10, as discussed above, the passenger seat 22" can be easily replaced or swapped out with the accessory 82 that is coupled to the same front coupling members 34' and rear coupling members 35' using the same latch system 10. As illustrated in FIGS. 9 and 10, the accessory 82 is illustrated as a storage or toolbox and configured to accommodate various items or tools that the driver of the vehicle may need or desire. Also, since the driver is positioned in the seat 22' and access to these items or tools is readily available as the accessory box 82 is positioned directly adjacent to the driver. The accessory 82 can also be a cooler, bucket, tank storage, gun case, or other accessory that the user or driver may desire. By providing such a latch system 10, as disclosed herein, any type of accessory 82 can be easily attached to the floor 24 to replace one of the seats 22 of a side-by-side vehicle. It should further be noted that while a two seat side-by-side vehicle is discussed herein, a four seat side-by-side or a six seat or any combination of seats in an off-road vehicle, performance vehicle, or vehicle can be provided where any of the seats can be switched with any desired accessory in any desired orientation or configuration.

Turning to FIGS. 11-17, a side-by-side off-road vehicle 84 is illustrated that includes seats 22' and 22" that are attached to the floor 24 by way of the front coupling members 34 and rear coupling members 35 as shown in FIGS. 7 and 8. As illustrated, the side-by-side off-road vehicle 84 can include the driver seat 22' and the passenger seat 22", where the driver seat 22' is associated with a steering wheel 86 and drive pedals 88. While the vehicle 84 illustrates driver seat 22' and passenger seat 22" adjacent to one another, as illustrated in FIGS. 7 and 8, the passenger seat 22" can be replaced with an accessory 82 to accommodate the desires of a driver positioned in the driver seat 22', as illustrated in FIGS. 9 and 10. Additionally, a rear storage area 90 having a floor 24 can be configured to have the front coupling members 34' and the rear coupling members 35' similar to those shown in FIGS. 7-9 to accommodate an additional seat 22 or accessory 82 that can be easily removably coupled to the vehicle 84 thereby providing further custom configuration and coupling of seats and accessories to the vehicle 84 in an easy manner utilizing the latch system 10, as discussed herein.

In use, the user of the vehicle 84 can determine initially what the user may require in the vehicle 84 before going out on a trip employing the vehicle 84. Once determined, the user can easily reconfigure the seating and accessory configuration of the vehicle 84 by positioning a seat 22 where desired and an accessory or accessories 82 where desired to accommodate the desired task or trip. Here again, the accessory 82 can include a storage box, toolbox, gun case, tank storage, a cooler, or any other desired accessory. Alternatively, it may be desired to not use an accessory 82 to thereby keep the area clear and simply exposing the floor 24. Additionally, the front coupling members 34 and the rear coupling members 35 can be used as tie down points to attach banjo cords or other straps. Once selected, the user can easily attach the desired seats 22 and accessories 82 utilizing the versatile latch system 10, as discussed above.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A system for selectively coupling an object to a vehicle comprising:
an object having a pair of front legs and a pair of rear legs, each of the legs having a floor-engaging member having an upper surface and a pair of side surfaces;

a pair of forward-front integral coupling members configured to slidably accept and engage the pair of front legs floor-engaging members, and two pair of rear-side integral coupling members positioned adjacent to both of the rear legs floor engaging members; and a latch positioned on one of the rear legs configured to releasably engage two of the rear-side integral coupling members.

2. The system according to claim 1 wherein the forward-front integral coupling members are selectively engaged with the upper surface and a pair of side surfaces.

3. The system according to claim 1 wherein forward-front integral coupling members define an aperture which has an inner upper bearing surface configured to engage the upper surface of the floor engaging member and a pair of inner sides surfaces, which engage the pair of side surfaces of the floor engaging member.

4. The system according to claim 3 wherein when placed between the two rear-side integral coupling members, a pair of side surfaces of the of the floor-engaging member engages an exterior side surface of the two rear-side integral coupling members.

5. The system according to claim 1 wherein the latch has a pair of first members which are fixed with respect to the pair of rear legs and pair of second members, the first members defining a pair of indexing notches.

6. The system according to claim 5 wherein the pair of second members are rotatable with respect to the first member from a first locked position to a second unlocked position.

7. The system according to claim 6 wherein the pair of second members each have a first arm and a second angularly displaced arm, the first arm having a hook member, which is configured to engage the rear-side integral coupling members.

8. The system according to claim 7 wherein the hook member is configured to selectively lockably engage an inner upper surface of the rear-side integral coupling members.

9. The system according to claim 8 wherein the hook member has a pair of tapered surfaces, which intersect at a semicircular surface and are configured to interface with a complementary semicircular surface of the rear-side integral coupling members.

10. The system according to claim 1 wherein the object is a seat.

11. The system according to claim 1 wherein the object is an accessory.

12. The system according to claim 11 where the accessory is selected from the group consisting of a storage box, a tool box, a storage tank, a cooler, a bucket, and a gun case.

13. The system according to claim 1 wherein the latch includes a pair of latches each latch, positioned on one of the rear legs and a single handle member coupled to each of the pair of latches to allow simultaneous actuation of the pair of latches.

14. A system for selectively coupling a seat to a vehicle comprising:

a seat having front legs and rear legs, each of the legs having a floor-engaging member having an upper surface and a pair of side surfaces;

a forward-front integral coupling member configured to slidably accept and engage the floor-engaging member associated with the front leg, and a pair of rear-side integral coupling members positioned adjacent to both of the floor engaging member of the rear leg; and a latch positioned on each rear leg configured to releasably engage the pair of rear-side integral coupling members, each latch having a pair of first members which are fixed with respect to the rear leg and pair of second members, the first members defining a pair of indexing notches, which are configured to lock each latch in one of a first locked position or in a second unlocked position, wherein the latch second members, are rotatable from the first locked position to the second unlocked position.

15. The system according to claim 14 wherein the second members are coupled together and each have a first arm and a second angularly displaced arm, the first arms having a hook member, which is configured to engage the rear-side integral coupling members.

16. The system according to claim 14 wherein the second arm defines a slot that slidable accepts a spring biased locking member.

17. The system according to claim 14 wherein the second member is rotated into the first locked position which positions a hook semicircular surface interfaces with a complementary semicircular surface of the rear-side integral coupling members.

18. The system according to claim 14 wherein the spring biases the locking member, into an indexing notch.

19. A system for selectively coupling a seat to a vehicle comprising:

a seat having a leg having a latch, the leg having a floor-engaging member having an upper surface and a pair of side surfaces;

a coupling member configured to slidably accept and engage the floor-engaging member associated with the leg; and the latch positioned on the leg configured to releasably engage the coupling member, the latch having a pair of first members which are fixed with respect to the leg and pair of second members, the first members defining a pair of indexing notches, which are configured to lock the latch in one of a first locked position or in a second unlocked position, wherein the latch second members, are rotatable from the first locked position to the second unlocked position, and first arms having a hook member, which are configured to engage the coupling member.

20. The system according to claim 19 wherein the second arm defines an aperture that slidable accepts a spring biased locking member.

21. The system according to claim 19 wherein the second member is rotated into the first locked position which positions a hook semicircular surface interfaces with a complementary semicircular surface of the coupling member.

22. The system according to claim 19 wherein the spring biases the locking member, into an indexing notch.

23. The system according to claim 19 wherein the coupling member defines an aperture which has an inner upper bearing surface configured to engage the upper surface of the floor engaging member.

24. The system according to claim 23 wherein the coupling member defines a pair of inner sides surfaces, which engage the pair of side surfaces of the floor engaging member.

* * * * *